Oct. 24, 1967   C. M. HYMAN   3,348,706
GRAIN TANK UNLOADING SYSTEM
Filed May 9, 1966   3 Sheets-Sheet 1
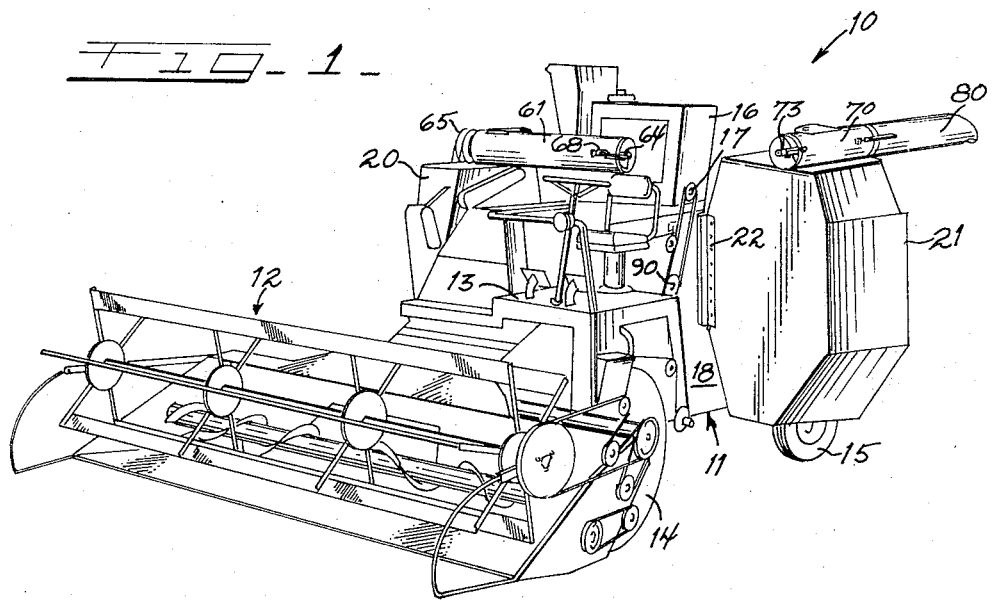
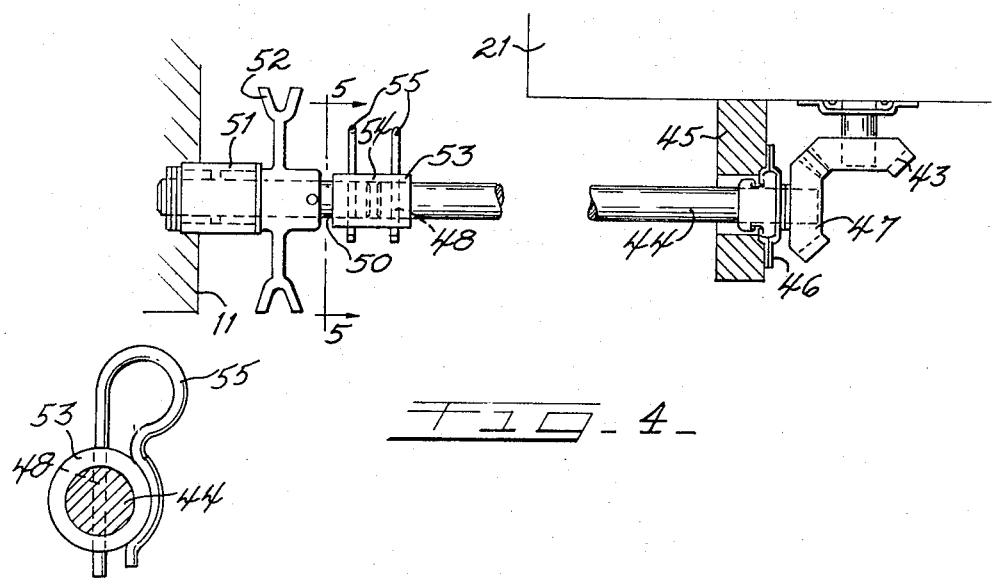
INVENTOR
CHARLES M. HYMAN
BY
ATT'Y.

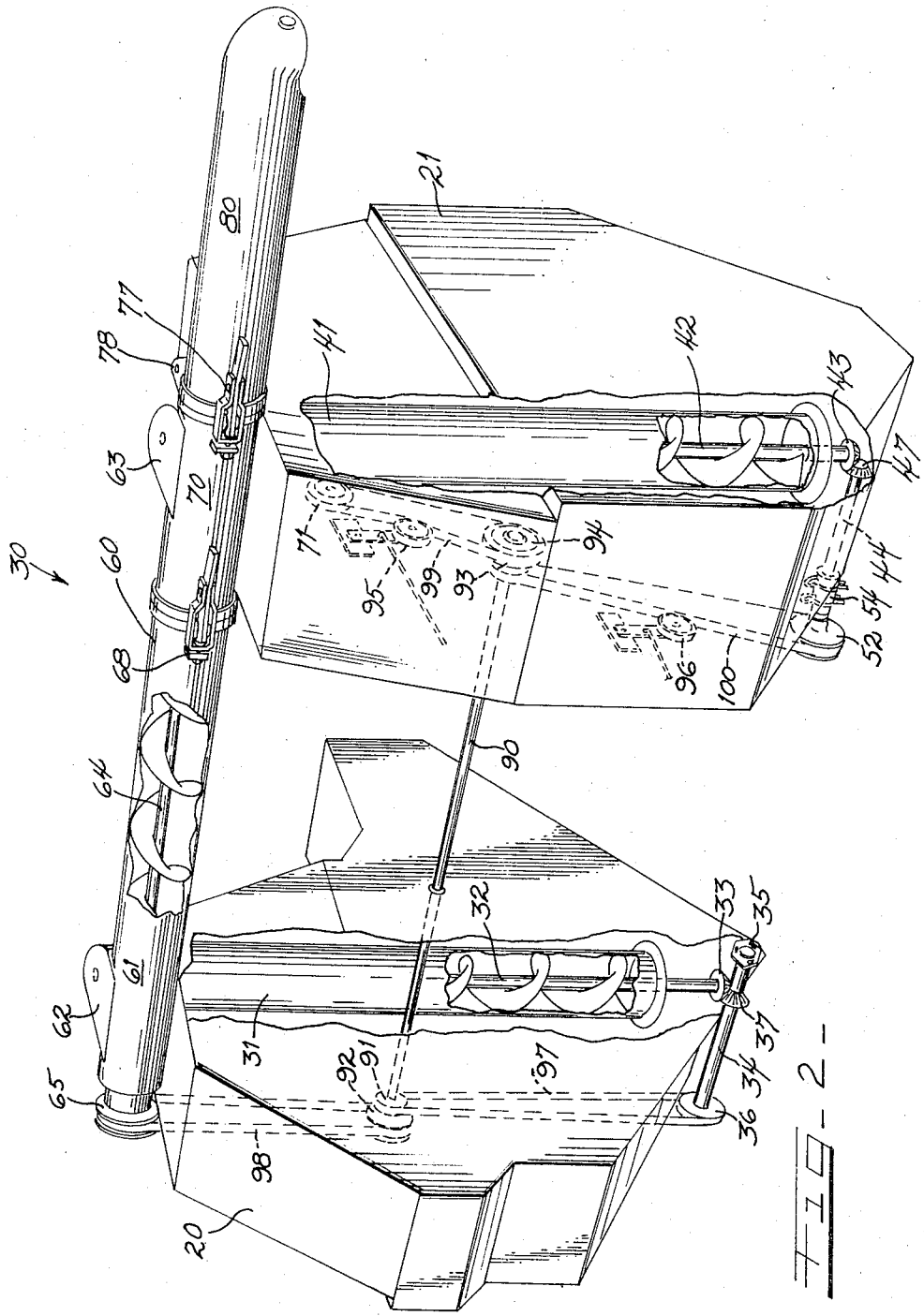

Oct. 24, 1967   C. M. HYMAN   3,348,706
GRAIN TANK UNLOADING SYSTEM
Filed May 9, 1966   3 Sheets-Sheet 3
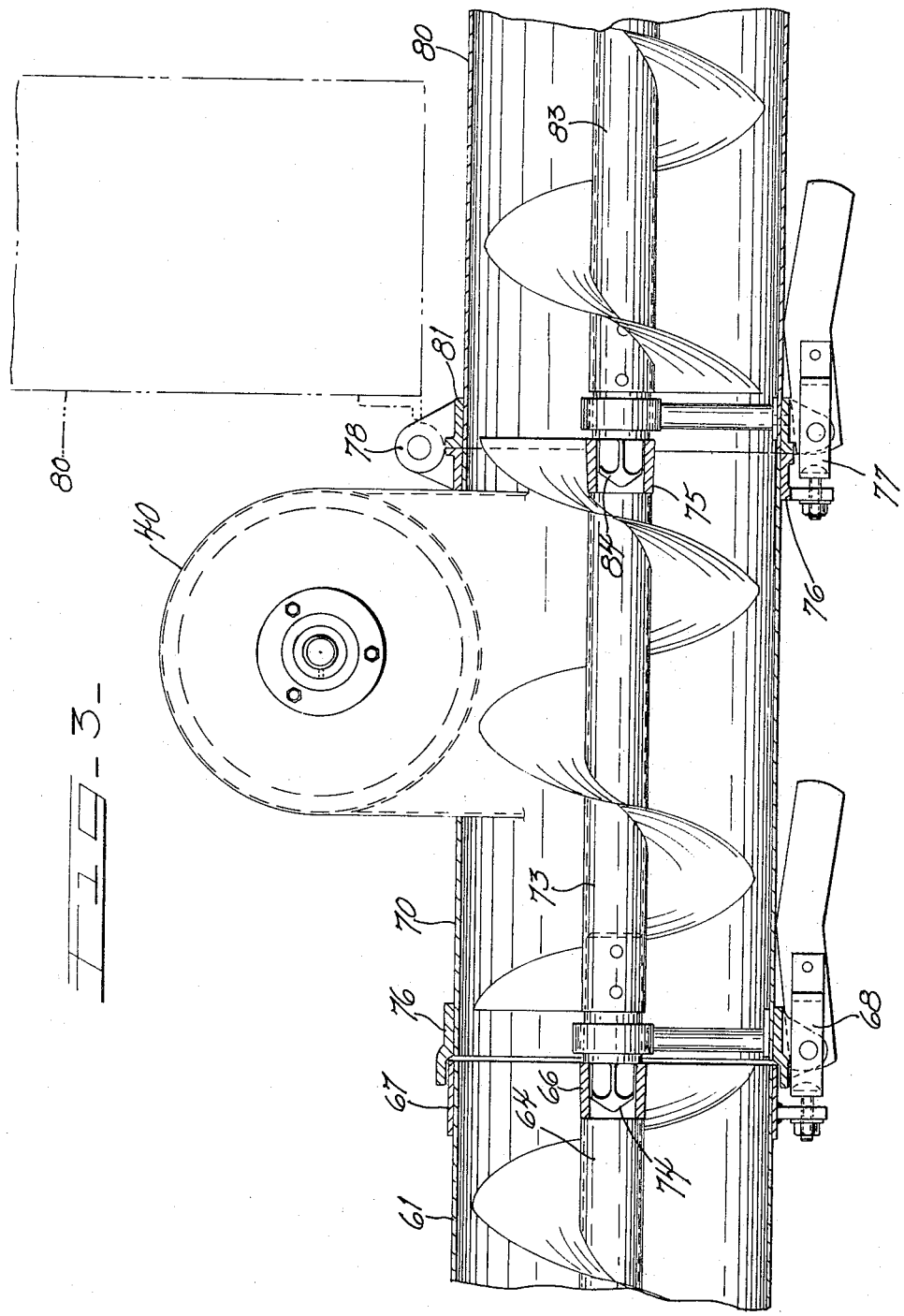
INVENTOR
CHARLES M. HYMAN
BY
ATT'Y.

United States Patent Office 3,348,706
Patented Oct. 24, 1967

3,348,706
GRAIN TANK UNLOADING SYSTEM
Charles M. Hyman, Davenport, Iowa, assignor to International Harvester Company, Chicago, Ill., a corporation of Delaware
Filed May 9, 1966, Ser. No. 548,454
9 Claims. (Cl. 214—17)

The present invention relates generally to combines having dual grain tanks and the like and more particularly to a new and improved unloading system for a combine having dual grain tanks.

The use of dual grain tanks on combines is desirable since it permits the grain carrying capacity of a combine to be increased while at the same time it gives significant control over the effective center of gravity of the unit thus affording more stable operation particularly on sloping terrain. One of the obstacles to the use of dual grain tanks is that when positioning the grain tanks alongside the frame of the combine it makes it difficult to provide drives to the elements contained within the combine frame and also to service these drives. This obstacle has been overcome by locating all of the drives for elements contained within the combine frame on one side of the combine and hingedly mounting the grain tank located on this side such that it can be swung away to service the drives. This system provides the added advantage that by so locating the drives and mounting the grain tank, the grain tank serves as a shield over the drives rendering them less dangerous. A combine having dual grain tanks, one of which is pivotable is disclosed in the patent to Hill No. 3,213,601 of Oct. 26, 1965. Reference may be made to this patent for a more complete disclosure of a combine having dual grain tanks.

During the operation of a combine the grain tanks are unloaded into a trailing wagon or truck that is maneuvered into position alongside the combine. Normally the procedure is to bring the combine to a stop during the unloading procedure. Since the combine is not being operated during the unloading procedure it is important to unload quickly to minimize the down time of the combine. The present industry standard is a system that will unload at a rate of one bushel per second.

Grain unloading systems such as that disclosed in the above-referred to patent to Hill are undesirable since the discharge spout extends outwardly from the side of the combine thus making the machine considerably wider and more difficult to transport. The unloading system of the type disclosed in the Hill patent also has the disadvantage that all the grain to be discharged from the dual tanks must be elevated through the discharge spout. Since all the grain must be elevated through the discharge spout, its capacity controls the speed in which the grain tanks can be unloaded. It is an inherent characteristic of conveyors comprising a tubular conduit having an auger journalled therein that the feed rate decreases as the angle between the horizontal and the auger's axis is increased. In other words, a conveyor of this type has a greater capacity in the horizontal position than in the vertical position. In the subject application an individual vertical elevator is provided for each of the grain tanks and thus the rate at which the pair of tanks can be unloaded has been increased. The discharge spout of the subject unloading system lies above a horizontal axis and thus its capacity does not limit the systems capacity. Furthermore, the discharge spout in the subject application can be collapsed and folded back parallel to the longitudinal axis of the combine so that during transport of the combine the discharge spout does not increase the width of the combine.

The drive for the unloading system disclosed herein is simple, it includes a minimum of parts, permits one of the grain tanks to pivot away from the combines and also permits the discharge spout to be collapsed into a transport position.

An object of the present invention is to provide a discharge system for a dual grain tank combine having a high rate of discharge.

Another object of the present invention is the provision of a grain discharge system for a dual grain tank combine having an individual elevator for each of the grain tanks.

Still another object of the present invention is the provision of a grain unloading system for a dual grain tank combine having individual elevators for each grain tank and a discharge spout that can be collapsed into a transport position.

These and other objects of the invention will become more apparent from the specifications and drawings, wherein:

FIGURE 1 is a perspective view of a combine having dual grain tanks with the movable tank pivoted away from the combine frame;

FIGURE 2 is a perspective view of the dual grain tanks having portions broken away to disclose the unloading system;

FIGURE 3 is an enlarged cross-sectional view of the horizontal conveyor of the discharge system;

FIGURE 4 is a partial view of the drive for the vertical elevator contained in the movable grain tank, and FIGURE 5 is a cross-sectional view taken along line 5—5 of FIGURE 4.

Referring now to the drawings wherein like reference characters designate like or corresponding parts throughout the several views, there is shown in FIGURE 1 a combine generally designated 10 including a frame 11 including spaced apart side panels 18 (only one illustrated), a header 12, operator's platform 13, drive wheels 14, dirigible wheels 15 and an engine 16 having an engine driveshaft sheave 17. The combine 10 is provided with a right grain tank 20 that is rigidly secured to the frame 11 of the combine. The left grain tank 21 is secured to a side panel 18 of the frame 11 by a hinge 22 that will permit the tank 21 to swing away from the side panel 18 into the position shown in FIGURE 1. In FIGURE 2 the grain tanks 20 and 21 are shown in their normal position relative to each other.

The system 30 for unloading the grain tanks 20 and 21 is best shown in FIGURE 2. The unloading system 30 includes a first vertical conduit 31 located within the right grain tank 20 and a first auger 32 journalled for rotation within conduit 31. The bottom end of conduit 31 is open and terminates above the floor of grain tank 20 to thus permit grain from the tank to be fed up conduit 31. The core of auger 32 has a beveled gear 33 secured to its lower end. A stub shaft 34 is journalled in a bearing 35 in a direction normal to the auger 32 and transverse to the longitudinal axis of the combine. The free end of stub shaft 34 that is located outwardly of the grain tank 20 has secured thereto a sheave 36. Stub shaft 34 also supports a bevel gear 37 in driving relationship with bevel gear 33. Upon rotation of stub shaft 34 first auger 32 is thereby driven. The means for driving stub shaft 34 will be disclosed.

A second vertical conduit 41 is located within the left grain tank 21 and has a second vertical auger 42 journalled for rotation within it. The core of the second vertical auger 42 has secured thereto a bevel gear 43. A shaft 44 is journalled by bearing 46 carried by a block 45 that extends downwardly from the undersurface of left grain tank 21. (See FIGURE 4). The outer end of shaft 44 carries a bevel gear 47 that is adapted to mesh with bevel gear 43. The inner free end of shaft 44 has an aperture 48 formed therein for a purpose to be described. A stub shaft 50 is journalled in a bearing 51 carried by the frame 11 of the combine upon which is mounted a sheave 52. The free end of stub shaft 50 has an aperture 54 formed therein. Shafts 44 and 50 are located such that when the movable grain tank 21 is in the normal operative position the free ends of the shafts are aligned with each other. An apertured collar 53 is adapted to slide over the adjacent free ends of shafts 44 and 50. A pair of spring clips 55, as can be best seen in FIGURES 4 and 5, are adapted to extend through the apertures formed in collar 53 and apertures 48 and 54 to thus couple shaft 50 to shaft 44. This coupling is released when it is desired to swing the left grain tank 21 away from the combine frame 11 and recoupled when normal operation is resumed.

The horizontal conduit generally designated 60 includes a stationary section 61, a swingable section 70 and a discharge spout 80 and extends in a transverse direction over the grain tanks 20 and 21. The stationary section 61 of the horizontal conduit is joined to the first vertical duct 31 by a connecting hood 62. The swingable section 70 of the horizontal conduit 60 is joined to the second vertical conduit 41 by a connecting hood 63. An auger made of three separate pieces 64, 73 and 83 extend through the horizontal conduit 60 throughout its entire length. The auger has a sheave 65 secured to its core and located outwardly of the right grain tank 20. The three sections of the auger are all driven through sheave 65. Section 64 of the auger extends through the stationary section 61 of the horizontal conduit and has a female coupling 66 on its end opposite the sheave 65. The end of the stationary section 61 adjacent the left grain tank 21 carries a reinforcing ring 67 and a portion of a an overcenter latch 68.

The swingable section 70 of the horizontal conduit 60 is secured to the left grain tank 21 and is adapted to swing with the left grain tank as it pivots about hinge 22. The swingable section 70, has reinforcing rings 76 at each end and the other portion of the overcenter latch 68 at its right end. The auger section 73 is carried within the swingable section 70 of the conduit and has a male coupling 74 at its right end and a female coupling 75 at its left end. One portion of an overcenter latch 77 is carried on reinforcing ring 76 at the left end of section 70. At the left end of the swingable section 70 diametrically opposite to the overcenter latch 77 there is mounted one portion of a hinge 78. When it is desired to swing the left grain tank 21 away from the combine frame 11 the overcenter latch 68 is released and upon swinging the grain tank away the male coupling 74 is withdrawn from the female coupling 66.

The discharge spout 80 carries the auger section 83. The right hand end of the discharge spout 80 carries a reinforcing ring 81 upon which is mounted the other portions of the overcenter latch 77 and hinge 78. The right hand end of auger section 83 is provided with a male coupling 84 that is adapted to be received by the female coupling 75. When it is desired to collapse the horizontal conduit 60 by positioning the discharge spout 80 longitudinally rather than transversely of the combine the overcenter latch 77 is released and the discharge spout 80 is pivoted about the hinge 78. The dischrge spout 80 is shown in phantom line in FIGURE 3 in its transport position.

The drive for the two vertical augers 32 and 42 and the auger extending through horizontal conduit 60 is taken from a driveshaft 90 that extends through the frame 11 of the combine and the stationary right grain tank 20. The right hand end of the driveshaft 90 carries externally of the right grain tank 20 an inner sheave 91 and an outer sheave 92. The inner sheave 91 is aligned vertically with the sheave 36 carried by stub shaft 34 and the two sheaves are connected by a first belt 97. The outer sheave 92 is aligned vertically with the sheave 65 and these sheaves are connected by a second belt 98. The left hand end of driveshaft 90 carries an inner sheave 93 and an outer sheave 94. The outer sheave 94 is aligned with the engine driveshaft sheave 17 and is connected to this sheave by a top belt 99. A primary clutch 95 is carried by the side panel 18 of combine frame 11 and functions to engage and disengage the drive between sheave 17 and sheave 94. The inner sheave 93 is aligned with the sheave 52 carried on the stub shaft 50 and these sheaves are connected by a lower belt 100. A secondary clutch 96 carried by the side panel 18 of the combine frame 11 and functions to engage and disengage the drive between sheave 93 and sheave 52. With the secondary clutch 96 engaged the discharge of both tanks can be controlled by the primary clutch 95. If it is desired to unload the right tank first then the secondary clutch 96 is disengaged and the primary clutch 95 is engaged. After the right grain tank 20 has been emptied then the secondary clutch 96 can be engaged to unload the left grain tank 21. It should be noted that when it is not considered necessary to be able to unload the grain tank individually the secondary clutch 96 can be eliminated.

During operation of the combine when it is necessary to unload the grain tanks a trailing wagon or truck is maneuvered alongside the combine such that the discharge spout 80 is located over the truck bed. The primary and secondary clutches 95 and 96 are then engaged and rotary motion is transmitted from the engine driveshaft sheave 17 through the top belt 99 to the driveshaft 90. The rotary motion of the driveshaft 90 is transmitted through the first belt 97, stub shaft 94 and bevel gears 33 and 37 to the first vertical auger 32. The rotary motion from the driveshaft 90 is also transmitted through the outer sheave 92, second belt 98 and sheave 65 to the horizontal auger of the horizontal conduit 60. The rotary motion of the driveshaft 90 is further transmitted through inner sheave 93 is transmitted through the lower belt 100, sheave 52, shafts 50 and 44 and beveled gears 47 and 43 to the second vertical auger 52.

The first and second vertical augers 32 and 42 raise the grain from the bottoms of the right and left grain tanks 20 and 21 through the first and second vertical conduits 31 and 41 and transfer it through the connecting hoods 62 and 63 to the horizontal conduit 60. The grain elevated through the first and second vertical conduits 31 and 41 is then transmitted through the horizontal conduit and discharged through the discharge spout 80 into a truck or trailer.

If it is desired to discharge the right tank 20 first then the same procedure is followed except that the secondary clutch 96 is not engaged until the right tank 20 is emptied.

It should be understood of course that the foregoing disclosure relates to only preferred embodiments of the invention and that numerous modifications or alterations may be made therein without departing from the spirit and scope of the invention as set forth in the appended claims.

What is claimed is:

1. In a combine having a frame extending along a longitudinal axis, said frame including spaced apart side panels parallel to said longitudinal axis;
 a first grain tank affixed to one of said side panels and extending outwardly therefrom;
 a second grain tank hingedly mounted on the other of said side panels and extending outwardly therefrom;
 means for unloading said first and second grain tanks including a first vertical conduit within said first grain tank, a first vertical auger mounted for rotation within said first vertical conduit, a second vertical conduit within said second grain tank, a second vertical auger mounted for rotation within said second vertical conduit, a horizontal conduit overlying said first and second grain tanks and communicating with said first and second vertical conduits, a horizontal auger mounted for rotation within said horizontal conduit, said horizontal conduit and auger including releasable couplings that will permit a portion of said horizontal conduit and auger to be secured to said second grain tank and to pivot away from the combine frame with the second grain tank;

and drive means for said first and second vertical augers and said horizontal auger.

2. The invention as set forth in claim 1 wherein said drive means includes a drivershaft lying transverse to the longitudinal axis of the combine and extending through said spaced-apart side panels and said first grain tank, said drivershaft having a first free-end portion, a driven sheave mounted on said free end portion in the clearance between said second grain tank and said other of said side panels, said first-free end portion having means mounted thereon for transmitting rotary motion to said second vertical auger, and the other free-end of said driveshaft having means mounted thereon for transmitting rotary motion to said first vertical auger and said horizontal auger.

3. The invention as set forth in claim 2 wherein said means mounted on the first free end portion of said driveshaft for transmitting rotary motion to said second vertical auger includes a releasable coupling to permit said second grain tank to be pivoted away from said combine frame.

4. The invention as set forth in claim 1 wherein said horizontal conduit includes a portion that extends transversely beyond said second grain tank and functions as a discharge spout.

5. The invention as set forth in claim 4 wherein said discharge spout portion of said horizontal conduit is mounted upon a hinge to permit it to assume a transport position parallel to the combine's longitudinal axis.

6. The invention as set forth in claim 2 wherein said horizontal conduit includes a portion that extends transversely beyond said second grain tank and functions as a discharge spout.

7. The invention as set forth in claim 6 wherein said discharge spout portion of said horizontal conduit is mounted upon a hinge to permit it to assume a transport position parallel to the combine's longitudinal axis.

8. The invention as set forth in claim 3 wherein said horizontal conduit includes a portion that extends transversely beyond said second grain tank and function as a discharge spout.

9. The invention as set forth in claim 8 wherein said discharge spout portion of said horizontal conduit is mounted upon a hinge to permit it to assume a transport position parallel to the combine's longitudinal axis.

References Cited
UNITED STATES PATENTS

| | | | |
|---|---|---|---|
| 2,783,907 | 3/1957 | Hudgins | 214—522 |
| 3,213,601 | 10/1965 | Rowland-Hill | 56—473.5 |

ROBERT G. SHERIDAN, *Primary Examiner.*